(12) United States Patent
Bellows (10) Patent No.: US 10,685,196 B2
(45) Date of Patent: Jun. 16, 2020

(54) APPARATUS AND METHOD FOR PRODUCING AN APPROPRIATE QUANTITY OF RFID READS

(71) Applicant: SYMBOL TECHNOLOGIES, INC., Schaumburg, IL (US)

(72) Inventor: David E. Bellows, Wantagh, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/064,119

(22) Filed: Oct. 26, 2013

(65) Prior Publication Data

US 2015/0116088 A1    Apr. 30, 2015

(51) Int. Cl.
*G06K 7/10* (2006.01)
*G06K 7/00* (2006.01)

(52) U.S. Cl.
CPC ....... *G06K 7/10356* (2013.01); *G06K 7/0008* (2013.01)

(58) Field of Classification Search
None
See application file for complete search history.

(56) References Cited

U.S. PATENT DOCUMENTS

| | | | |
|---|---|---|---|
| 7,830,262 B1 * | 11/2010 | Diorio et al. | 340/572.4 |
| 8,120,494 B1 * | 2/2012 | Aiouaz et al. | 340/572.7 |
| 8,228,173 B2 | 7/2012 | Missimer et al. | |
| 8,519,848 B2 | 8/2013 | Stern | |
| 8,947,210 B2 * | 2/2015 | Kim | 340/10.4 |
| 2005/0190711 A1 * | 9/2005 | Morimoto | H04W 36/30 370/311 |
| 2006/0022800 A1 | 2/2006 | Krishna et al. | |
| 2007/0205896 A1 * | 9/2007 | Beber et al. | 340/572.1 |
| 2008/0129485 A1 * | 6/2008 | Tuttle | G06K 7/0008 340/539.11 |
| 2008/0150692 A1 * | 6/2008 | Missimer et al. | 340/10.1 |
| 2008/0180221 A1 | 7/2008 | Tuttle | |
| 2009/0195361 A1 * | 8/2009 | Smith | 340/10.1 |
| 2010/0176928 A1 | 7/2010 | Isomura | |
| 2010/0207739 A1 | 8/2010 | Smith et al. | |

(Continued)

OTHER PUBLICATIONS

International Search Report and Written Opinion dated Feb. 17, 2015 in counterpart PCT application PCT/US2014/059656.

(Continued)

*Primary Examiner* — Chico A Foxx
(74) *Attorney, Agent, or Firm* — Yuri Astvatsaturov (57) ABSTRACT

An RFID reader configures each of a plurality of antennas operating in the RFID reader to operate in one of a first state and a second state, configures each of the plurality of antennas to operate in a first session and a second session and to operate in opposite states in the first session and the second session, and configures adjacent antennas or adjacent groups of antennas to operate in opposite states in the first session and the second session. During operation, each of the plurality of antennas is configured to read an RFID tag within a range of the antenna when a state of the RFID tag for the session in which the antenna is configured to operate matches the state in which the antenna is configured to operate and to switch the state of the RFID tag to the opposite state for each session.

4 Claims, 7 Drawing Sheets

(56) References Cited

U.S. PATENT DOCUMENTS

| | | | |
|---|---|---|---|
| 2010/0245054 A1* | 9/2010 | Kim | G06K 7/10336 340/10.4 |
| 2011/0193685 A1 | 8/2011 | Tuttle | |
| 2012/0086554 A1* | 4/2012 | Wilkinson | G06K 7/10138 340/10.1 |
| 2012/0274449 A1* | 11/2012 | Wilkinson | G01S 11/06 340/10.1 |
| 2012/0275531 A1* | 11/2012 | Wu | H04B 7/0413 375/267 |
| 2013/0027191 A1* | 1/2013 | Wilkinson | G06K 7/10009 340/10.6 |
| 2013/0127598 A1* | 5/2013 | Kim | G06K 7/10029 340/10.2 |
| 2014/0266617 A1* | 9/2014 | Wilkinson | G06K 7/10475 340/10.1 |
| 2014/0266621 A1* | 9/2014 | Jones | G06K 7/10227 340/10.1 |
| 2014/0320271 A1* | 10/2014 | Jones | G06K 7/10297 340/10.34 |
| 2015/0278563 A1* | 10/2015 | Duron | H01Q 1/2216 340/10.1 |

OTHER PUBLICATIONS

Office Action for Australian Patent Application No. 2014340583 dated Nov. 3, 2016.
Office Action for Canadian Patent Application No. 2928403 dated Dec. 16, 2016.

* cited by examiner

APPARATUS AND METHOD FOR PRODUCING AN APPROPRIATE QUANTITY OF RFID READS

BACKGROUND OF THE INVENTION

Radio frequency identification (RFID) readers may be used in, for example, retail environments to keep track of merchandise tagged with RFID tags, with a goal of ensuring that merchandise in inventory is properly displayed on the sales floor. It is very important to retailers to make sure their sales floor shelves are never empty, especially if there is merchandise in the back of the store that can be used for replenishment. Currently, retailers often do not know that replenishment is needed, so stores miss sales opportunities when merchandise in the back room should instead be on the empty sales floor shelves. RFID readers are typically configured to read RFID tags within a predefined range and are effective in detecting new merchandise introduced on the sales floor. However, RFID readers are not as effective in tracking merchandise already on the sales floor, and knowing the accurate shelf count is critical so replenishment happens at the appropriate time. Simply removing an item from the shelf is no guarantee that it will be purchased, so the shelf's inventory count should not be automatically reduced in this situation. For example, when an item is removed from a shelf, the item may be moved to another location in the store and left there or it may be returned later to its proper shelf location. If the item is purchased and removed from the store, existing point of sales systems may automatically reduce the inventory count for that item, providing an indication that the item needs to be replenished. However, when the item is moved to another location in the store, the item may not be easily located and returned to the proper shelf. To avoid missing sales opportunities, it is critical not only to know the merchandise currently in a store's total inventory, but also know the accurate breakdown of shelf inventory on the sales floor versus back room inventory as well as know which merchandise is improperly shelved on the sales floor.

Attempts made to track the specific locations of tagged merchandise using RFID readers as the tagged merchandise moves through a store have shown to be near or beyond the limits of RFID technology. Department level tracking is therefore a desirable alternative to tracking the specific locations of tagged merchandise as the merchandise moves through a store because when it can be confirmed that an item has been moved from a region of the store (also referred to as a department) where the item is meant to be properly shelved, there is a higher level of certainty that the item is no longer properly shelved. However, prior attempts at department level tracking have resulted in either an excessive amount of data, which is extremely difficult to manage, or not enough data.

In RFID protocol, there are four sessions, sessions 0, 1, 2, and 3, and two states, state A and state B. By default, an unread RFID tag is in state A, and once the tag is read, the tag may be switched to the B state, depending on the session. Once shelved, the majority of tagged items are not moved around and do need to be read repetitively. However, in session 0, the RFID reader reads an RFID tag over and over until the RFID tag is out of range or shielded from the RFID reader, creating an excessive amount of data and potentially preventing tags closer to the edges of the reader's range from being read. Session 1 is similar to session 0 except that in session 1 when an RFID tag is read by the RFID reader, the tag will not be read again for a predefined period. For example, the tag will not be read for the next one and a half seconds. Accordingly, in session 1, tagged items may be read every one and a half seconds, also creating an excessive amount of data. The vast majority of these tags don't need to be read repetitively since nothing of significance is happening to them. This exorbitant amount of unnecessary data can be difficult to manage.

In sessions 2 and 3, when the tagged item is read, the state is switched from state A to state B and the tag stays in state B if it can detect RF power within a defined period, for example, five to fifteen seconds. While the tag is in state B, the tag won't be read again by the RFID reader, reducing the amount of data provided by the RFID reader. If the tag is switched from state A to state B and the tag does not detect radio frequency (RF) power after more than, for example, fifteen seconds, the tag is switched back to state A. Using this approach, the tag may only be read once if RF power is constantly detectable, potentially producing insufficient data. In other words, the tag won't be tracked beyond its first and only read.

Another approach utilizes a checkerboard of alternating readers (or alternating antennas within a reader), wherein an RFID reader (or antenna) configured to read in session/state 3A, for example, switches a tag from 3A to 3B after reading the tag, and another RFID reader (or antenna) configured to read in session/state 3B switches the tag to state 3A after reading the tag. The intent is that as a tagged item moves through a space, it will be read once by the 3A reader and the tag state will be flipped to 3B so that when the tag is then in the range of 3B reader, the tag will be read by the 3B reader and the tag state will be flipped back to 3A, and so on. However, coverage in the 3B regions may not be acceptable because a prerequisite of a tag being read by the 3B reader is that the tag was previously read by a 3A reader and the tag did not lose RF power for more than a predefined period, for example, 5 seconds, before entering the 3B region. RF power typically may not cover one hundred percent of a space. As such, there may be natural nulls, RF hidden spots, for example, under metal shelves and next to people, and/or tag shadowing. Using this approach, if an RFID tag is not switched to the 3B state because it was not read by a 3A reader or because it cannot detect RF power for a predefined period after being read by a 3A reader, the 3B readers will not be utilized to their full potential, creating unwanted holes in RF coverage and again providing insufficient data.

Accordingly, there is a need for an apparatus and method for balancing the number of RFID reads to produce an appropriate quantity of data.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and methods wherein an RFID reader configures each of a plurality of antennas operating in the RFID reader to operate in one of a first state and a second state, configures each of the plurality of antennas to operate in a first session and a second session and to operate in opposite states in the first session and the second session, and configures adjacent antennas or adjacent groups of antennas to operate in opposite states in the first session and the second session. During operation, each of the plurality of antennas is configured to read an RFID tag within a range of the antenna when a state of the RFID tag for the session in which the antenna is configured to operate matches the state in which the antenna is configured to operate and to switch the state of the RFID tag to the opposite state for each session.

Figure 1:
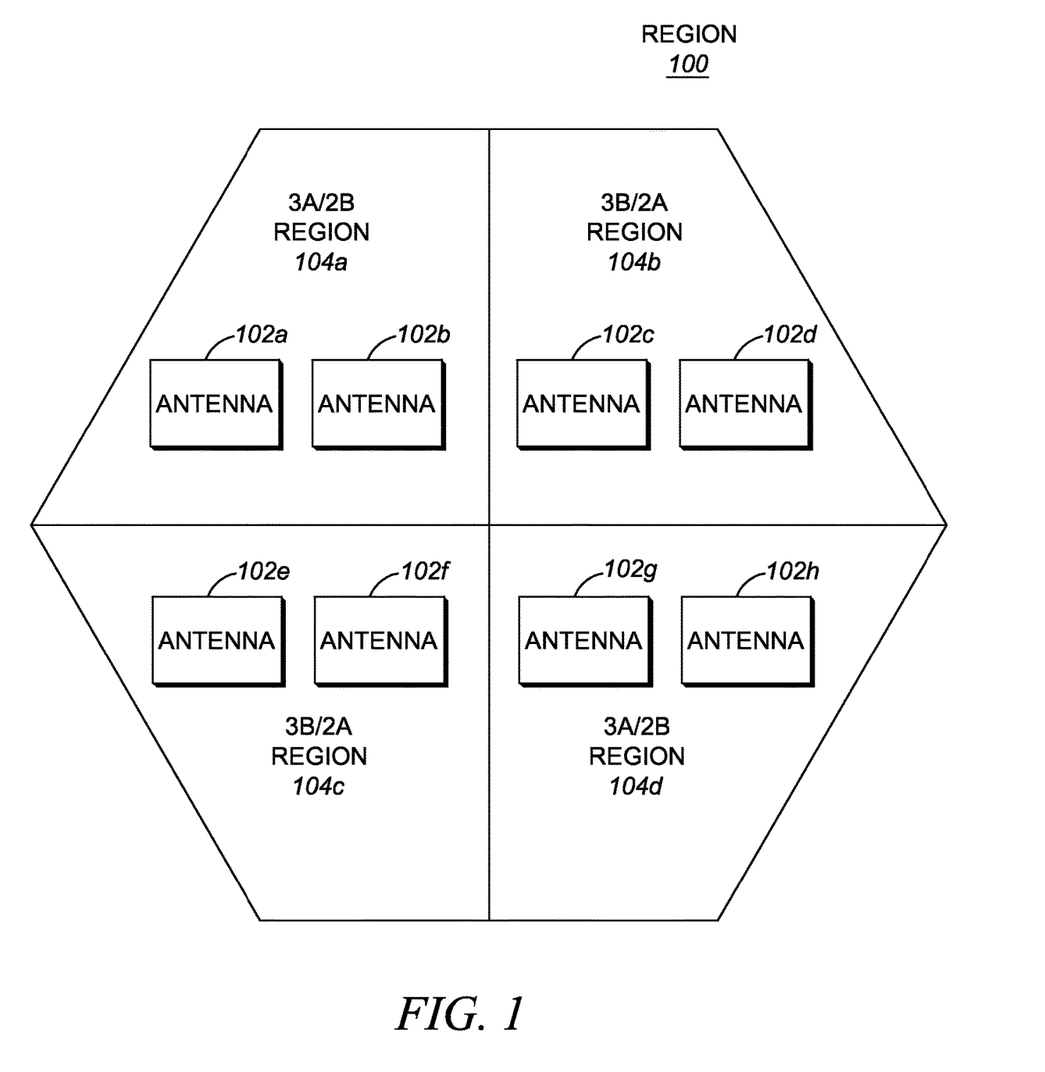
FIG. 1 is a block diagram of a region covered by a Radio Frequency identification (RFID) reader in accordance with some embodiments.

FIG. 1 is a block diagram of a region covered by a Radio Frequency identification (RFID) reader in accordance with some embodiments. The RFID reader is configured to read RFID tags within a predefined region 100 and includes multiple antennas for enabling the RFID reader to read RFID tags within region 100. Antennas 102 (i.e., antennas 102a-102h) of an RFID reader are configured to read specific RFID tags within a sub-region 104 (i.e., regions 104a-104d), such that each of antennas 102 is also configured to operate in two sessions and in an opposite state in each of the two sessions. For example, each antenna 102 may be configured to operate in session 2 and session 3 of the RFID protocol and in an opposite state, A or B, in each of the two sessions. When an antenna is operating in, for example, session 2/state A, the antenna is also configured to subsequently operate in session 3/state B (the opposite state to that of session 2). The RFID reader may transmit on one antenna at a time using, for example, a time division multiple access (TMDA) scheme, although the RFID reader may use other access schemes.

In an embodiment, antennas 102 may be divided into groups of two such that in each group, during a first transmission time slot, a first antenna and a second antenna in the group are configured to operate in session 2 or 3 and state A or B and during the next transmission time slot, the first and second antennas in the group are configured to operate in the opposite session and state. For example, if antennas 102a and 102b are in a group, during the first time slot, antennas 102a and 102b may be configured to operate in session 2 and states A or B (for example, antennas 102a and 102b may operate in 2B) and during the next time slot, the antennas may operate in 3A. Antennas 102a and 102b may, for example, operate sequentially within a time slot. In another embodiment, during the first transmission time slot, the first antenna in a group (i.e., antenna 102a) may be configured to operate in, for example, 2B for a period in that time slot and 3A for a time period in that time slot, and during the second transmission time slot, the second antenna in the group may be configured to operate in, for example, 2B for a period in that time slot and 3A for a time period in that time slot. Therefore, in this embodiment, the first antenna or second antenna in a group is configured to operate in a first session and state and in the second session and opposite state in one time slot, and in the next the slot, the other antenna in the group is configured to operate in the first session and state and in the second session and opposite state.

When the antennas are grouped, the grouped antennas may operate in the same session and state and adjacent groups may be configured to operate in opposite states for the same sessions. Continuing with the example above, antennas 102a/102b may both operate in 3A/2B, and adjacent groups may operate in 3B/2A. (Note that this notation (e.g. session & state X/session & state Y) means that the antennas are configured to operate in both sessions and states X and Y. For example, 3A/2B means that the antennas are configured to operate in both 3A and 2B.) Accordingly, in region 104a, for example, the RFID reader may configure antennas 102a and 102b to read RFID tags in the 3A and 2B states. In adjacent region 104b, the RFID reader may configure antennas 102c and 102d to read RFID tags in the 3B and 2A states (i.e., an alternate session/state to region 104a). In region 104c, the RFID reader may configure antennas 102e and 102f to read RFID tags in the 3B and 2A states (i.e., an alternate session/state to adjacent region 104a). In region 104d, the RFID reader may configure antennas 102g and 102h to read RFID tags in the 3A and 2B states (i.e., an alternate session/state to regions 104b and 104c). Accordingly, in each region the session and state is inverse to the session and state in an adjacent region.

Figure 2A:
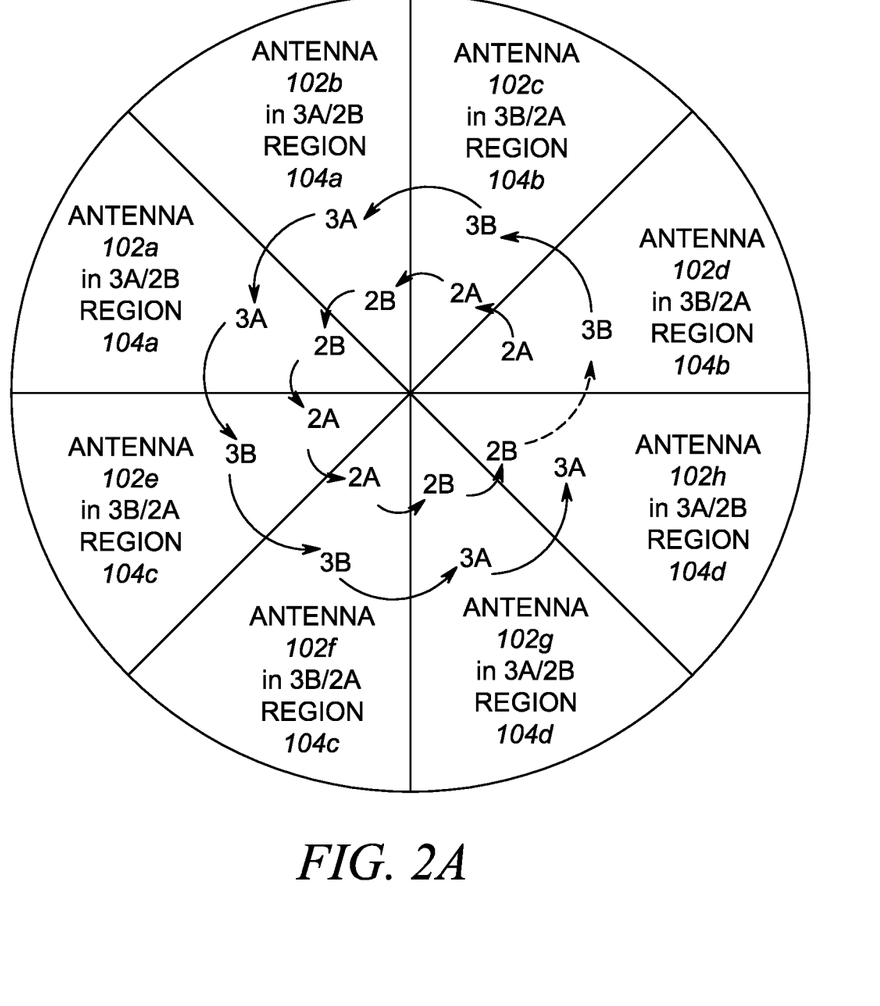
FIGS. 2A and 2B are diagrams of transmission patterns and sequences of grouped antennas in accordance with some embodiments.

FIGS. 2A and 2B are diagrams of transmission patterns and sequences of grouped antennas in accordance with some embodiments. In the embodiment shown in FIG. 2A, the antennas are grouped in the regions as shown in FIG. 1. Consider an example where the RFID reader begins to transmit on antenna 102d and transmits in time slots moving counter-clockwise. Antenna 102d will transmit in the 2A state in a first time slot, antenna 102c will transmit in the 2A state in a second time slot (i.e., the same session and state as antenna 102d because these two antennas are grouped in region 104b and configured to operate in the same session and state). Antenna 102b will transmit in 2B in a third time slot; antenna 102a will transmit in 2B in a fourth time slot; and so on. In the next iteration, as depicted by the dashed line, antenna 102d will transmit in the 3B state in a first time slot; antenna 102c will transmit in the 3B state in a second time slot; antenna 102b will transmit in the 3A state in a third time slot; antenna 102a will transmit in the 3A state in a fourth time slot; and so on. In these embodiments, rather than operating each group of antennas in only one session, for example, session 2 or session 3, each group of antennas is configured to run in both sessions 2 and 3 and in the opposite states.

Figure 2B:
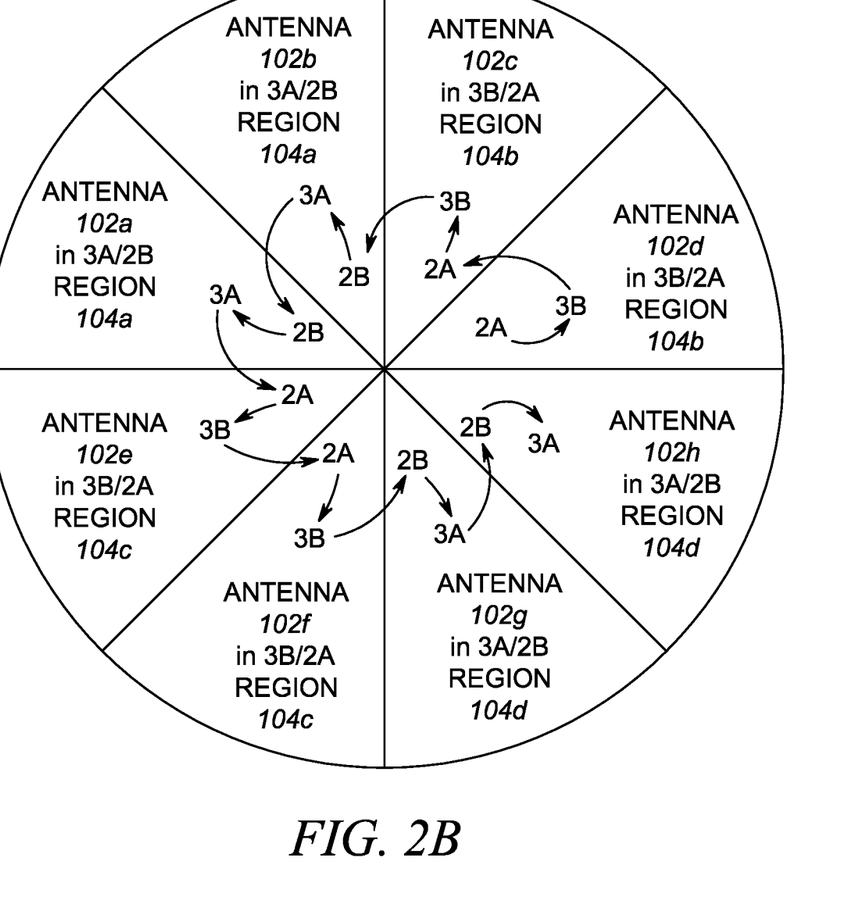

In the embodiment shown in FIG. 2B, the antennas are also grouped in the regions as shown in FIG. 1. Similar to FIG. 2A, the RFID reader begins to transmit on antenna 102d and antenna 102d transmits in the 2A state for a period in a first time slot and in the 3B state for another period in the first time slot, antenna 102c transmits in the 2A state for a period in a second time slot and in the 3B state for another period in the second time slot, antenna 102b transmits in the 2B state for a period in a third time slot and in the 3A state for another period in the third time slot, antenna 102a will transmit in the 2B state for a period in a fourth time slot and in the 3A state for another period in the fourth time slot, and so on.

Figure 3:
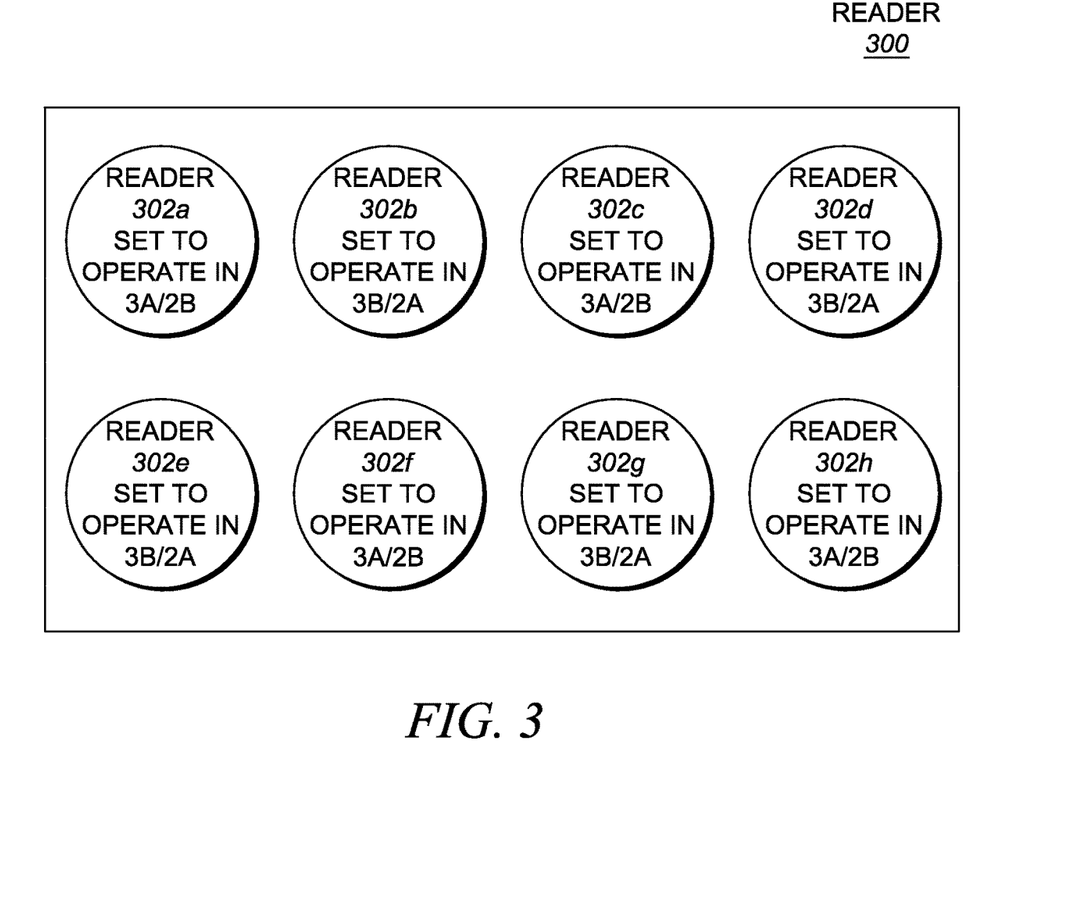
FIG. 3 is a diagram of a configuration of readers in accordance with some embodiments.

In another embodiment, rather than dividing region 100 into sub-regions 104, the settings of individual readers as a whole could alternate. For example, the settings on the plurality of all antennas for each individual reader could be set to the first and second sessions with opposite states and the plurality of all antennas on adjacent readers may be configured to operate in opposite states. For example, reader 302a may operate in 3A/2B and adjacent readers 302b and 302e may operate in 3B/2A, as shown, for example in FIG. 3.

Each of the antennas is configured to read an RFID tag within a range of the antenna when the state of the RFID tag (A or B) for the session the antenna is configured in (2 or 3) matches the state in which the antenna's session is configured to operate. Returning to FIG. 1, consider an example where an RFID tag was read previously by a 3A antenna and switched to a 3B state and by a 2B antenna and switched to a 2A state (i.e., the RFID tag is now in the 3B/2A state). If the tag remains visible to RF power of an RFID reader, when the RFID tag is moved, for example, within regions 104a and 104d, antennas 102a/102b and antennas 102g/104h may not read the tag. In this example, the tag won't be read again in regions 104a and/or 104d because the antennas in these regions are configured to read RFID tags in the 3A/2B state. However, when the tag is moved to regions 104b or 104c, the tag will be read by antennas 102c/102d and 102e/102f because these antennas are configured to read RFID tags in the 3B/2A state (the current state of the tag, i.e. the tag may be read by the antennas configured to read 3B tags and/or 2A tags). Similarly, if a tag is visible to RF power of an RFID reader and the session and state of the tag is 3A/2B, the tag won't be read in regions 104b and 104c because the antennas in those regions are not configured to read tags in the 3A/2B state (i.e. the 3A state or the 2B state).

If a tag is not visible to RF power of the RFID reader because, for example, the tag is under a metal shelf or in a section that does not have the RF energy after a predefined period, for example, fifteen seconds, the tag will switch to a 3A/2A state. While the tag remains hidden, it won't be read by any of the antennas 102.

Consider an example where a tag is read by a 3A antenna (i.e., one of the antennas in region 104a or 104d). In such a case, the tag was either pulled into view from a hidden RF location in a 3A region (for example, a hidden RF location in region 104a or 104d) or moved from a 3B location (i.e., region 104b or 104c) to a visible RF location in a 3A region (i.e., region 104a or 104d). In an example where a tag is read by a 2B antenna (i.e., one of the antennas in region 104a or 104d), then the tag was moved from a visible RF 2A location (i.e., region 104b or 104c), where it was read by a 2A antenna and maintained its RF power, to a visible RF 2B location (i.e., regions 104a or 104d). In an example where a tag is read by a 3B antenna (i.e., one of the antennas in region 104b or 104c), then the tag was moved from a visible RF 3A location (i.e., regions 104a or 104d), where it was read by a 3A antenna and maintained its RF power, to a visible RF 3B location (i.e., regions 104b or 104c). In an example where a tag is read by a 2A antenna (i.e., one of the antennas in region 104b or 104c), then the tag was either pulled into view from a hidden RF 2A location (i.e., regions 104b or 104c) or moved from a 2B location (i.e., regions 104a or 104d) to a visible RF 2A location (i.e., regions 104b or 104c).

Figure 4:
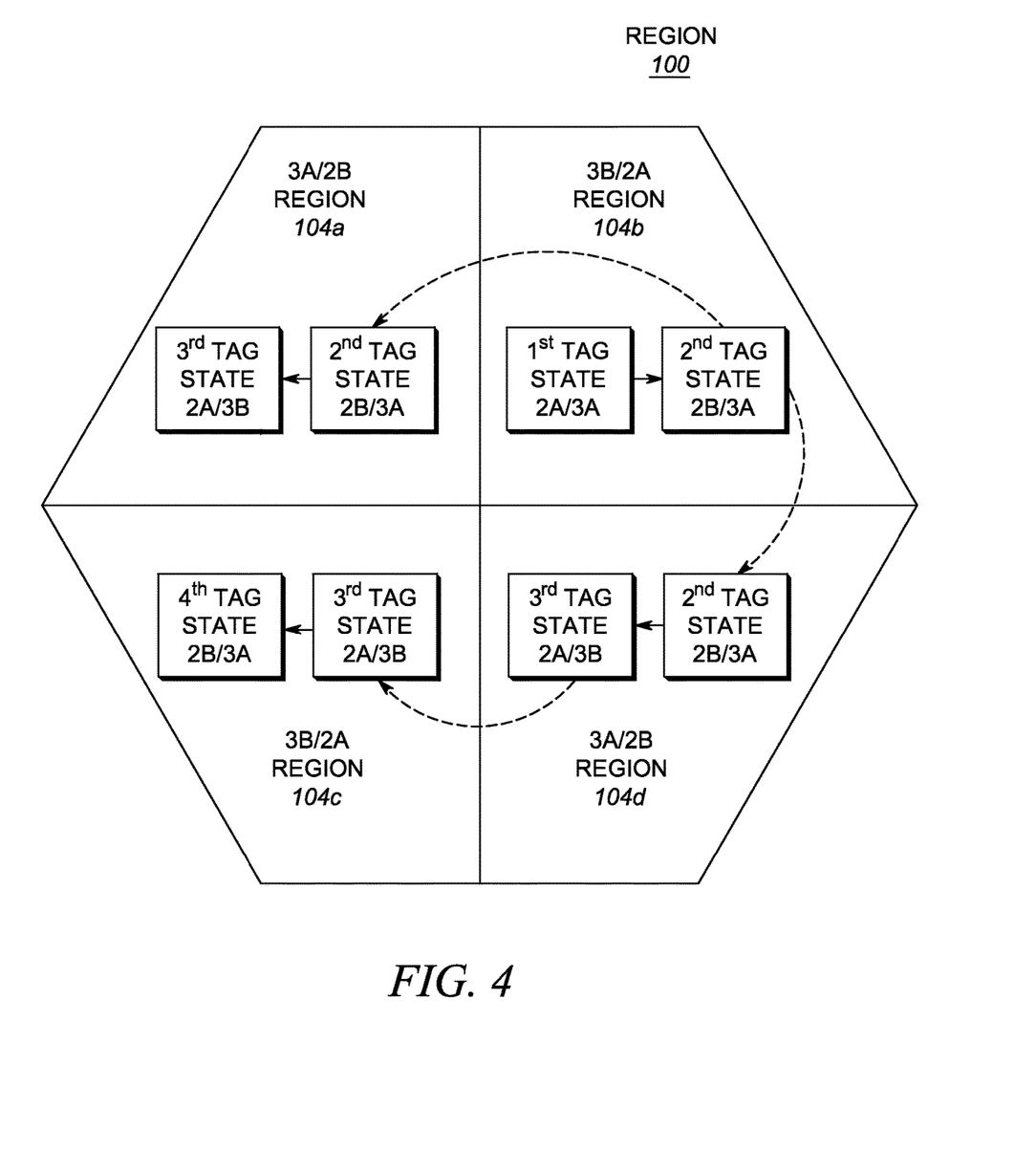
FIG. 4 is a diagram of RFID tag states as an RFID tag moves through a region in accordance with some embodiments.

FIG. 4 is a diagram of RFID tag states as an RFID tag moves through a region in accordance with some embodiments. In FIG. 4, the antennas are grouped in the regions as shown in FIG. 1. The tag state of a hidden tag in region 104b will be set to a first tag state—2A/3A state. If the hidden tag is made visible to the RF in this region, when antennas 102c and 102d are transmitting in the 3B state, the antennas will not read the tag because the tag state is 3A. However, antennas 102c and 102d are also configured to transmit the 2A state. Therefore, one of antennas 102c and 102d will read the tag and switch the tag state to 2B, causing the tag state to be 2B/3A. If the tag is moved (as denoted by the dashed lines) to regions 104a or 104d (the adjacent regions), the antennas transmitting in the 2B state in those regions will read the tag and switch the tag to the 2A state, and the antennas transmitting in the 3A state in those regions will read the tag and switch the tag to the 3B state, causing the tag state to be 2A/3B. If the tag is moved to the adjacent quadrants (i.e., regions 104b or 104c), the antennas transmitting in the 2A state in those regions will read the tag and switch the tag to the 2B state and the antennas transmitting in the 3B state in those regions will read the tag and switch the tag to the 3A state, causing the tag state to be 2B/3A. For ease of illustration, movement is only shown from regions 104d to 104c.

If at any time and in any region the tag becomes RF hidden for a period of time, the tag state will switch back to 2A and 3A. Once the tag becomes RF visible again, the tag will not be read by the "B" antennas (i.e., the antennas operating 2B or 3B states in the region where the tag is made visible). However, each region also has an "A" antenna (i.e., the antennas operating 2A or 3A states in the region), as a backup to ensure that the tag is read at least once in each region. Embodiments therefore balance between providing too much data as is done when using session 0 or session 1 of the RFID protocol and providing insufficient data as is done in other current approaches where RFID antennas are configured solely in either session 2 or in session 3 of the RFID protocol.

Figure 5:
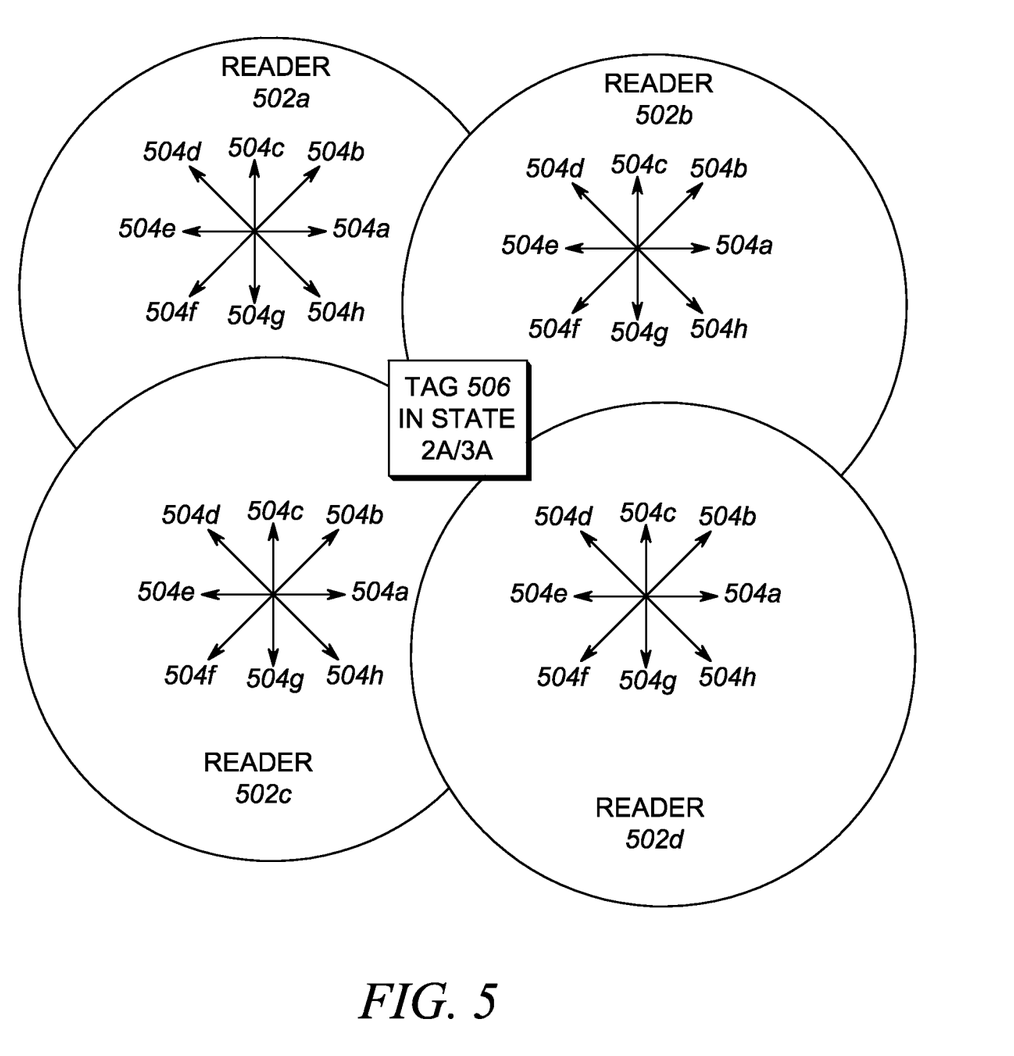
FIG. 5 is a diagram that shows how collected RFID data may be interpreted in accordance with some embodiments.

FIG. 5 is a diagram that shows how collected RFID data may be interpreted in accordance with some embodiments. Consider that a region is covered by four readers 502 (i.e., 502a-502d), each of which includes multiple antennas 504a-504h. If specific antennas are configured to operate in specific states and sub-regions, the tags read by antenna 504 may indicate movements of RFID tags. For example, antennas 504a, 504g and 504h of reader 502a, antennas 504e, 504f and 504g of reader 502b, antennas 504a, 504b and 504c of reader 502c, and antennas 504c, 504d and 504e of reader 502d may be configured to read an item with RFID tag 506 in a department. Each of antennas 504 may be configured to read RFID tags according to one or more of the embodiments described above. If RFID tag 506 was pulled from a hidden location and read by any of the antennas (i.e., antennas 504a, 504g and 504h of reader 502a, antennas 504e, 504f and 504g of reader 502b, antennas 504a, 504b and 504c of reader 502c, and antennas 504c, 504d and 504e of reader 502d) configured to read that tag, a processor can determine that the tagged item is still in the proper department and may not subtract the item from an inventory count or shelf count, although there is some indication of movement of the tagged item. However, if tag 506 is read by other antennas that are not configured to read that tag, a processor can determine that the tagged item is no longer in the proper department and may subtract the item associated with the tag from an inventory count or shelf count. The processor may make this determination after a specified number of tag reads are made by antennas and/or readers that are not configured to read that tag based on the sub-region or region they cover.

Figure 6:
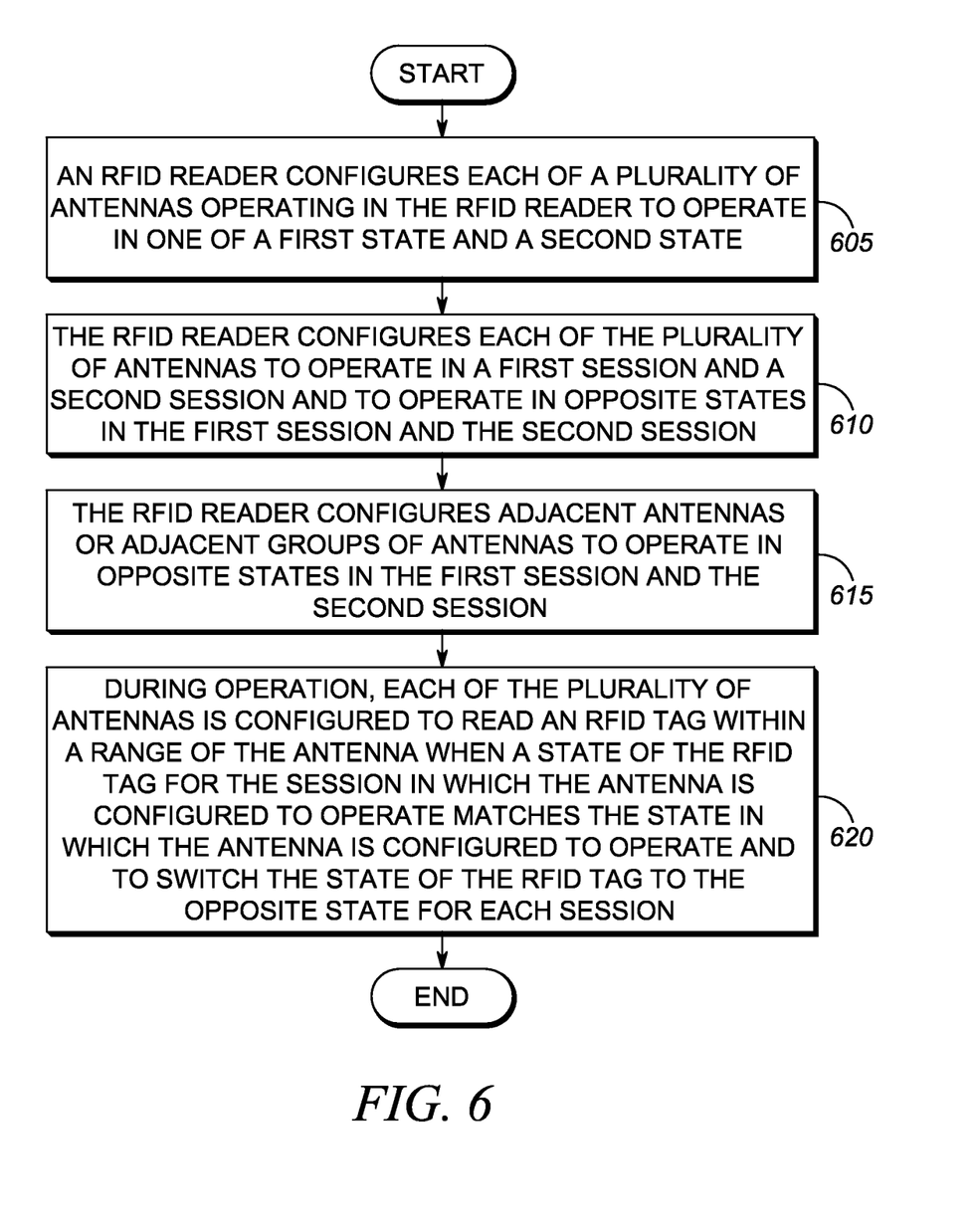
FIG. 6 is a flow diagram of the steps implemented in accordance with some embodiments.

FIG. 6 is a flow diagram of the steps implemented in accordance with some embodiments. At 605, an RFID reader configures each of a plurality of antennas operating in the RFID reader to operate in one of a first state and a second state. At 610 the RFID reader configures each of the plurality of antennas to operate in a first session and a second session and to operate in opposite states in the first session and the second session. At 615, the RFID reader configures adjacent antennas or adjacent groups of antennas to operate in opposite states in the first session and the second session. At 620, during operation, each of the plurality of antennas is configured to read an RFID tag within a range of the antenna when a state of the RFID tag for the session in which the antenna is configured to operate matches the state in which the antenna is configured to operate and to switch the state of the RFID tag to the opposite state for each session.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A radio frequency identification (RFID) reader comprising:
   a plurality of antennas each configured to operate in one of a first state and a second state opposite the first state, the plurality of antennas including, a first antenna having a first transmission pattern, a second antenna having a second transmission pattern, a third antenna having a third transmission pattern, a fourth antenna having a fourth transmission pattern, a fifth antenna having a fifth transmission pattern, a sixth antenna having a sixth transmission pattern, a seventh antenna having a seventh transmission pattern, and an eighth antenna having an eighth transmission pattern, the plurality of antennas being arranged such that the first transmission pattern is sandwiched between the second transmission pattern and the eighth transmission pattern, the second transmission pattern is sandwiched between the first transmission pattern and the third transmission pattern, the third transmission pattern is sandwiched between the second transmission pattern and the fourth transmission pattern, the fourth transmission pattern is sandwiched between the third transmission pattern and the fifth transmission pattern, the fifth transmission pattern is sandwiched between the fourth transmission pattern and the sixth transmission pattern, the sixth transmission pattern is sandwiched between the fifth transmission pattern and the seventh transmission pattern, the seventh transmission pattern is sandwiched between the sixth transmission pattern and the eighth transmission pattern, the eighth transmission pattern is sandwiched between the first transmission pattern and the seventh transmission pattern, and a total transmission pattern of the plurality of antennas extends over a 360-degree range; and a processor configured to:
(a) control the first antenna to operate in the first state and a first session;
(b) subsequent to (a), control the first antenna to operate in the second state and a second session;
(c) subsequent to (b), control the second antenna to operate in the first state and the first session;
(d) subsequent to (c), control the second antenna to operate in the second state and the second session;
(e) subsequent to (d), control the third antenna to operate in the second state and the first session;
(f) subsequent to (e), control the third antenna to operate in the first state and the second session;
(g) subsequent to (f), control the fourth antenna to operate in the second state and the first session;
(h) subsequent to (g), control the fourth antenna to operate in the first state and the second session;
(i) subsequent to (h), control the fifth antenna to operate in the first state and the first session;
(j) subsequent to (i), control the fifth antenna to operate in the second state and the second session;
(k) subsequent to (j), control the sixth antenna to operate in the first state and the first session;
(l) subsequent to (k), control the sixth antenna to operate in the second state and the second session;
(m) sub sequent to (l), control the seventh antenna to operate in the second state and the first session;
(n) subsequent to (m), control the seventh antenna to operate in the first state and the second session;
(o) subsequent to (n), control the eighth antenna to operate in the second state and the first session; and
(p) subsequent to (o), control the eighth antenna to operate in the first state and the second session, wherein during operation each of the plurality of antennas is configured to read an RFID tag within a range of the antenna when a state of the RFID tag for the session in which the antenna is configured to operate matches the state in which the antenna is configured to operate during the session and to switch the state of the RFID tag to the opposite state for the session in which the antenna is configured to operate.

2. The RFID reader of claim 1, wherein the processor is further configured to control each of the plurality of antennas to operate during a respective time slot that is separate from the respective time slot of any other of the plurality of antennas.

3. A radio frequency identification (RFID) reader comprising:
a plurality of antennas each configured to operate in one of a first state and a second state opposite the first state, the plurality of antennas including, a first antenna having a first transmission pattern, a second antenna having a second transmission pattern, a third antenna having a third transmission pattern, a fourth antenna having a fourth transmission pattern, a fifth antenna having a fifth transmission pattern, a sixth antenna having a sixth transmission pattern, a seventh antenna having a seventh transmission pattern, and an eighth antenna having an eighth transmission pattern, the plurality of antennas being arranged such that the first transmission pattern is sandwiched between the second transmission pattern and the eighth transmission pattern, the second transmission pattern is sandwiched between the first transmission pattern and the third transmission pattern, the third transmission pattern is sandwiched between the second transmission pattern and the fourth transmission pattern, the fourth transmission pattern is sandwiched between the third transmission pattern and the fifth transmission pattern, the fifth transmission pattern is sandwiched between the fourth transmission pattern and the sixth transmission pattern, the sixth transmission pattern is sandwiched between the fifth transmission pattern and the seventh transmission pattern, the seventh transmission pattern is sandwiched between the sixth transmission pattern and the eighth transmission pattern, the eighth transmission pattern is sandwiched between the first transmission pattern and the seventh transmission pattern, and a total transmission pattern of the plurality of antennas extends over a 360-degree range; and a processor configured to:
(a) control the first antenna to operate in the first state and a first session;
(b) subsequent to (a), control the second antenna to operate in the first state and the first session;
(c) subsequent to (b), control the third antenna to operate in the second state and a first session;
(d) subsequent to (c), control the fourth antenna to operate in the second state and the first session;
(e) subsequent to (d), control the fifth antenna to operate in the first state and the first session;
(f) subsequent to (e), control the sixth antenna to operate in the first state and the first session;
(g) subsequent to (f), control the seventh antenna to operate in the second state and the first session;
(h) subsequent to (g), control the eighth antenna to operate in the second state and the first session;
(i) subsequent to (h), control the first antenna to operate in the second state and the second session;
(j) subsequent to (a), control the second antenna to operate in the second state and the second session;
(k) subsequent to (b), control the third antenna to operate in the first state and a second session;
(l) subsequent to (c), control the fourth antenna to operate in the first state and the second session;
(m) sub sequent to (d), control the fifth antenna to operate in the second state and the second session;
(n) subsequent to (e), control the sixth antenna to operate in the second state and the second session;

(o) subsequent to (f), control the seventh antenna to operate in the first state and the second session;
(p) subsequent to (g), control the eighth antenna to operate in the first state and the second session, wherein during operation each of the plurality of antennas is configured to read an RFID tag within a range of the antenna when a state of the RFID tag for the session in which the antenna is configured to operate matches the state in which the antenna is configured to operate during the session and to switch the state of the RFID tag to the opposite state for the session in which the antenna is configured to operate.

4. The RFID reader of claim 1, wherein the processor is further configured to control each of the plurality of antennas to operate during a respective time slot that is separate from the respective time slot of any other of the plurality of antennas.

* * * * *